United States Patent
Mo et al.

(10) Patent No.: US 10,090,910 B2
(45) Date of Patent: Oct. 2, 2018

(54) ADVANCED UPLINK MULTIPLE ACCESS SCHEME FOR SATELLITE CONTROL NETWORK

(71) Applicant: Intelligent Fusion Technology, Inc., Germantown, MD (US)

(72) Inventors: Zijian Mo, Germantown, MD (US); Zhonghai Wang, Germantown, MD (US); Gang Wang, Germantown, MD (US); Genshe Chen, Germantown, MD (US); Tien Nguyen, Germantown, MD (US); Khanh Pham, Germantown, MD (US)

(73) Assignee: INTELLIGENT FUSION TECHNOLOGY, INC., Germantown, MD (US)

( * ) Notice: Subject to any disclaimer, the term of this patent is extended or adjusted under 35 U.S.C. 154(b) by 43 days.

(21) Appl. No.: 15/377,892

(22) Filed: Dec. 13, 2016

(65) Prior Publication Data

US 2018/0167134 A1     Jun. 14, 2018

(51) Int. Cl.
*H04B 7/185*     (2006.01)
*H04B 7/216*     (2006.01)

(52) U.S. Cl.
CPC ......... *H04B 7/18513* (2013.01); *H04B 7/216* (2013.01)

(58) Field of Classification Search
None
See application file for complete search history.

(56) References Cited

U.S. PATENT DOCUMENTS

| | | | | |
|---|---|---|---|---|
| 5,608,722 A | * | 3/1997 | Miller | H04B 7/0845 370/203 |
| 5,802,445 A | * | 9/1998 | Wiedeman | H04B 7/18543 340/600 |
| 6,072,770 A | * | 6/2000 | Ho | H04B 7/216 370/209 |
| 6,240,124 B1 | * | 5/2001 | Wiedeman | H04B 7/18534 370/318 |

(Continued)

OTHER PUBLICATIONS

Z. Mo, Z. Wang, X. Xiang, G. Wang, G. Chen, T. Nguyen, K. Pham, E. Blasch, "A study of multiple access schemes in satellite control network," In Proc. SPIE Defense and Security, Baltimore, MD, 2016. pp. 1-10.

(Continued)

*Primary Examiner* — Steven H Nguyen
(74) *Attorney, Agent, or Firm* — Anova Law Group, PLLC (57) ABSTRACT

In accordance with various embodiments, a method for uplink multiple accessing based on code division multiple access (CDMA) technology and a related system are provided. The method comprises: designing a practical uplink spreading waveform for a code division multiple access (CDMA) based SCN by leveraging a plurality of pseudo-random sequences and investigating a channel coding block and a modulation block for the CDMA based SCN; determining an uplink frequency sub-band division for the CDMA based SCN to optimize a tradeoff between a performance and an implementation cost of CDMA based SCN; and specifying a configuration of a control system of the CDMA based SCN.

18 Claims, 5 Drawing Sheets

(56) References Cited

U.S. PATENT DOCUMENTS

2004/0114552 A1* 6/2004 Lim ............... H04B 7/2041
                                              370/324
2007/0184849 A1* 8/2007 Zheng ............. H04B 7/06
                                              455/456.1
2010/0128660 A1* 5/2010 Becker ........... H04B 7/18582
                                              370/316

OTHER PUBLICATIONS

E. McCune, "DSSS vs FHSS narrowband interference performance issues", RF signal processing, pp. pp. 90-104, Sep. 2000. pp. 1-8.
E. H. Dinan and B. Jabbari, "Spreading codes for direct sequence CDMA and wideband CDMA cellular networks," in IEEE Communications Magazine, vol. 36, No. 9, pp. 48-54, Sep. 1998. pp. 1-7.
K. Kettunen, "Code Selection for CDMA Systems", S-38.220 Licentiate Course on Signal Processing in communications, Nov. 13, 1997. pp. 1-14.
F. Adachi, M. Sawahashi, and H. Suda, "Wideband DS-CDMA for Next-Generation Mobile Communications Systems," IEEE Communications Magazine, Sep. 1998. pp. 1-14.

* cited by examiner

$\Delta f = R_c(1 + \alpha)$

ADVANCED UPLINK MULTIPLE ACCESS SCHEME FOR SATELLITE CONTROL NETWORK

GOVERNMENT RIGHTS

This invention was made with Government support under Contract No. FA9453-15-M-0424, awarded by the United States Air Force Research Laboratory. The U.S. Government has certain rights in the present disclosure.

TECHNICAL FIELD

The disclosed subject matter generally relates to the field of satellite control networks, and more particularly, relates to an uplink multiple access method for satellite control network, and a related system.

BACKGROUND

Satellite control network (SCN) is an essential component in space field. For example, SCN can be used to provide tracking, telemetry and commanding for on-orbit satellites. As another example, SCN can be used to provide launch control for space lift vehicles, and test support for ballistic missiles and space experiments.

Different from a satellite communication network, SCN normally operates with low data rate, but requiring guaranteed error free of control flows between remote tracking stations (RTSs) and intended satellites. Recently, the capability of multiple satellites reception may be deserved as an update of the SCN in the future, especially the spectrum originally assigned to SCN would be shared with commercial wireless carriers. The multiple satellites reception enables the SCN to improve spectrum efficiency in the congested spectrum band.

The existing RTSs are equipped with phase modulation module. Then frequency division multiple access with phase modulation (FDMA/PM) is supposed to be a desired solution of multiple satellite reception implementation. However, FDMA/PM suffers severe carrier and subcarrier modulation losses, cross-modulation and harmonics losses, which degrade the system performance and result in spectrum inefficiency as well. In addition, the technology of FDMA/PM cannot be able to bring interference mitigation capability into the updated SCN system, so it hardly meet the challenging requirement of spectrum sharing.

Accordingly, it is desirable to provide an uplink multiple access method for satellite control network, and a related system.

BRIEF SUMMARY

In accordance with some embodiments of the disclosed subject matter, an uplink multiple access method for satellite control network and a related system are provided.

An aspect of the disclosed subject matter provides a method for uplink multiple accessing to a satellite control network. The method can comprise: designing a practical uplink spreading waveform for a code division multiple access (CDMA) based SCN by leveraging a plurality of pseudorandom sequences and investigating a channel coding block and a modulation block for the CDMA based SCN; determining an uplink frequency sub-band division for the CDMA based SCN to optimize a tradeoff between a performance and an implementation cost of CDMA based SCN; and specifying a configuration of a control system of the CDMA based SCN.

In some embodiments, the plurality of pseudorandom sequences include Walsh code and Gold code.

In some embodiments, designing the practical uplink spreading waveform, and investigating a channel coding block and a modulation block include: receiving a plurality of raw control data streams; channel coding and interleaving each raw control data stream to generate an encoded control data stream; dividing each encoded control data stream into an I signal modulated by an in-phase modulation, and a Q signal modulated by a quadrature-phase modulation; spreading the I signal and the Q signal of each encoded control data stream by a corresponding orthogonal variable spreading factor (OVSF) code spreader for separating each encoded control data stream with other encoded control data streams; and modulating the I signal and the Q signal of each encoded control data stream to generate modulated signals that are suited to characteristics of transmission channel.

In some embodiments, after channel coding and interleaving each raw control data stream and before dividing each encoded control data stream, the method further comprises: generating a long code by a 42 bits maximum length shift register; and scrambling each encoded control data stream with the long code.

In some embodiments, after spreading the I signal and the Q signal of each encoded control data stream and before modulating the I signal and the Q signal of each control data stream, the method further comprises: performing a bit-by-bit XOR operation to each control data stream with the Gold code by a gold code spreader to increase an interference tolerance of the encoded control data streams.

In some embodiments, spreading the signal and the Q signal of each encoded control data stream includes: generating a tree-structured OVSF code to provide orthogonality for separating each encoded control data streams, wherein the tree-structured OVSF code has at least one root that derives two branches, and each branch has a codeword extended from the root.

In some embodiments, modulating the I signal and the Q signal of each encoded control data stream is performed by a filtered Quadrature Phase Shift Keying (QPSK) data modulator.

In some embodiments, modulating the I signal and the Q signal of each encoded control data stream is using at least one of the following modulation algorithm: Binary phase-shift keying (BPSK), Quadrature Phase Shift Keying (QPSK), filtered BPSK, filtered QPSK, minimum-shift keying (MSK), Gaussian Minimum Shift Keying (GMSK), and 8 Phase Shift Keying (8PSK).

In some embodiments, the spread plurality of encoded control data streams have a same bandwidth for all users; and an uplink frequency sub-band division spreading factor of for different users are different.

In some embodiments, the uplink frequency sub-band division spreading factor includes a processing gain, which is derived from a minimum self-interference, an affordable hardware/software modification, and a negligible interference with a co-existing narrowband system.

In some embodiments, determining the processing gain includes: calculating a jamming margin to quantitatively describe a relation between the processing gain and an interference tolerance of the CDMA based SCN over the co-existing narrowband system.

In some embodiments, the jamming margin is calculated by using an equation of $A/J = G_s - E_b/N_0$, wherein A/J is the jamming margin, $G_s$ is the processing gain defined by a ratio of a spread spectrum bandwidth to an information bandwidth, and $E_b/N_0$ is a minimum required output signal to noise ratio per bit.

In some embodiments, specifying the configuration of the control system of the CDMA based SCN includes: analyzing a relationship among a spreading bandwidth, a channel separation, a chip rate and a roll-off factor of the CDMA based SCN, developing a channelization scheme for the control system of the CDMA based SCN, and estimating a number of supported satellites for the channelization scheme.

In some embodiments, the channelization scheme includes an inter-beam asynchronous spreading code assignment and a spectrum management.

In some embodiments, the spectrum management includes: designing each channel to provide the processing gain, the spreading bandwidth, a data rate, and a guard band requirement, wherein the guard band requirement is derived based on a Doppler Effect caused by mobility of satellites.

In some embodiments, estimating the number of supported satellites includes: generating an equation of a probability of bit rate error for a satellite control service by using a Bit Signal-Noise-Ratio (BSNR) degradation factor for the satellite control service; obtaining the BSNR degradation factor based on a polarization isolation factor among antenna beams in the one channel; determining a maximum supporting users using the equation.

In some embodiments, the equation of the probability of bit error rate for the satellite control service in an $i^{th}$ channel with a corresponding number of users $N_i$ is $$Pe_i = \frac{1}{2} \text{erfc}\left\{\sqrt{\frac{E_{bi}}{N_0}\Delta_i}\right\},$$

wherein $E_{bi}/N_0$ is a BSNR for satellite control service in the $i^{th}$ channel; $\Delta_i$ is the BSNR degradation factor for the satellite control service in the $i^{th}$ channel, which is calculated by $$\Delta_i = \frac{1}{1 + \frac{2}{3}\left\{\frac{E_{bi}}{N_0} \frac{P_i}{a_i PG_i}(N_i - 1)\right\}},$$

wherein $a_i$ is a number of antenna beams in the $i^{th}$ channel, $PG_i$ is the processing gain, $p_i$ is the polarization isolation factor among the antenna beams in the $i^{th}$ channel, which is calculated by $$p_i = 1 + \frac{10^{\frac{CP_i}{10}}}{2},$$

wherein $CP_i$ is a cross-polarization.

Another aspect of the disclosed subject matter provides a system for uplink multiple accessing for satellite control network (SCN), comprising: a hardware processor that is programmed to: design a practical uplink spreading waveform for a code division multiple access (CDMA) based SCN by leveraging a plurality of pseudorandom sequences and investigate a channel block and a modulation block for the CDMA based SCN; determine an uplink frequency sub-band division for the CDMA based SCN to optimize a tradeoff between a performance and an implementation cost of CDMA based SCN; and specify a configuration of a control system of the CDMA based SCN.

Other aspects of the disclosed subject matter can be understood by those skilled in the art in light of the description, the claims, and the drawings of the present disclosure.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements. It should be noted that the following drawings are merely examples for illustrative purposes according to various disclosed embodiments and are not intended to limit the scope of the present disclosure.

DETAILED DESCRIPTION

For those skilled in the art to better understand the technical solution of the disclosed subject matter, reference will now be made in detail to exemplary embodiments of the disclosed subject matter, which are illustrated in the accompanying drawings. Wherever possible, the same reference numbers will be used throughout the drawings to refer to the same or like parts.

In accordance with various embodiments, the disclosed subject matter provides a method for uplink multiple accessing based on code division multiple access (CDMA) technology for providing upgraded multiple satellite reception capability, high spectrum efficiency, and interference mitigation capability in the satellite control network.

In the disclosed method for uplink multiple accessing to a satellite control network, the update solution is based on CDMA technique. Instead of using orthogonal subcarriers in FDMA/PM, CDMA technique utilizes pseudorandom (PN) sequences to multiplex command data (CMD) streams with negligible self-interfering. CDMA technique can avoid the RTS to split power into one or more carriers or subcarriers, which do not carry any useful information. As such, the SCN can preserve a desired property of power efficiency, in particular supporting multiple satellites. More importantly, CDMA technique provides the SCN with additional interference mitigation for spectrum sharing by spreading signal as wideband pseudo noise.

To meet the desired requirement of SCN, the disclosed method can include the following features.

Firstly, the disclosed method provides an uplink spreading waveform can be designed by leveraging various PN sequences, e.g., Gold code, Orthogonal Variable Spreading Factor code (OVSF), etc.

Secondly, the disclosed method provides a designed uplink frequency sub-band division for CDMA. Through three perspectives including self-interference, interference tolerance, and hardware/software (HW/SW) modification, optimal spreading factors, such as processing gain, etc., can be calculated.

Thirdly, the disclosed method provides a designed configuration of the overall CDMA command system, including the guard band, the roll off factor, the channelization scheme, etc.

It should be noted that, the disclosed uplink multiple access method for satellite control network considers the spectrum efficiency improvement for better throughput performance, while preserving extremely low error rate (e.g., from $10^{-5}$ up to $10^{-9}$) of the CMD transmission between RTS and satellites. Also, the disclosed multiple access method is able to effectively perform interference mitigation when spectrum is shared with other operators.

Figure 1:
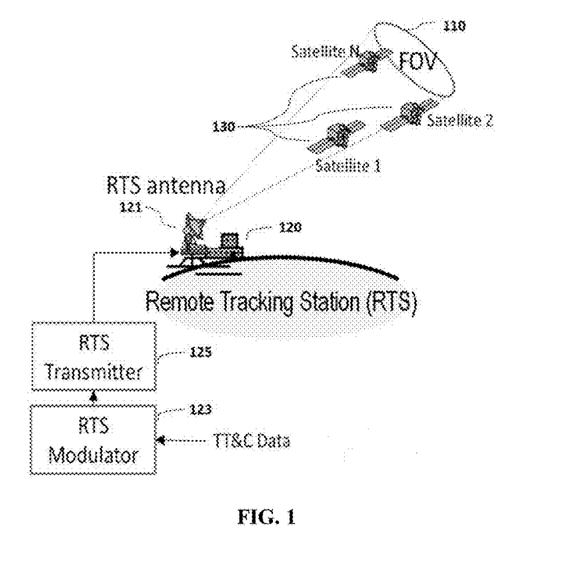
FIG. 1 illustrates a schematic diagram of an exemplary uplink multiple access system for satellite control network in accordance with some embodiments of the disclosed subject matter.

Referring to FIG. 1, a schematic diagram of an exemplary uplink multiple access system for satellite control network is shown in accordance with some embodiments of the disclosed subject matter.

As shown, the system includes at least one remote tracking station (RTS) 120 and multiple satellites 130 within a field of view (FOV) 110 of the RTS 120.

The RTS 110 can be located in any suitable platform, such as a ground hub, an offshore oil platform, an aircraft, a vehicle, a ship, etc. In some embodiments, the RTS 120 can include an RTS antenna 121, an RTS modulator 123, and an RTS transmitter 125.

The RTS antenna 121 has a field of view (FOV) 110, and assuming there are N number of satellites 130 within the FOV 110 of the RTS antenna 121 during a period of time. Since only uplink scenario is focused in this disclosure, the RTS 120 can transmit signals to the N number of satellites 130 within the FOV 110 via uplinks during the period of time.

The telemetry, tracking and control (TT&C) data can be transmitted from a central control center. The RTS modulator 123 can be used to modulate the TT&C data to generate a CDMA waveform. A detailed description of generating the CDMA waveform is described below in connection with FIG. 3. The RTS transmitter 125 can up-convert and amplify the modulated signal transmitted from the RTS modulator 123 up to a desired frequency, such as a specific carrier's frequency. Finally, the resulting signal can be transmitted by the RTS antenna 121.

Figure 2:
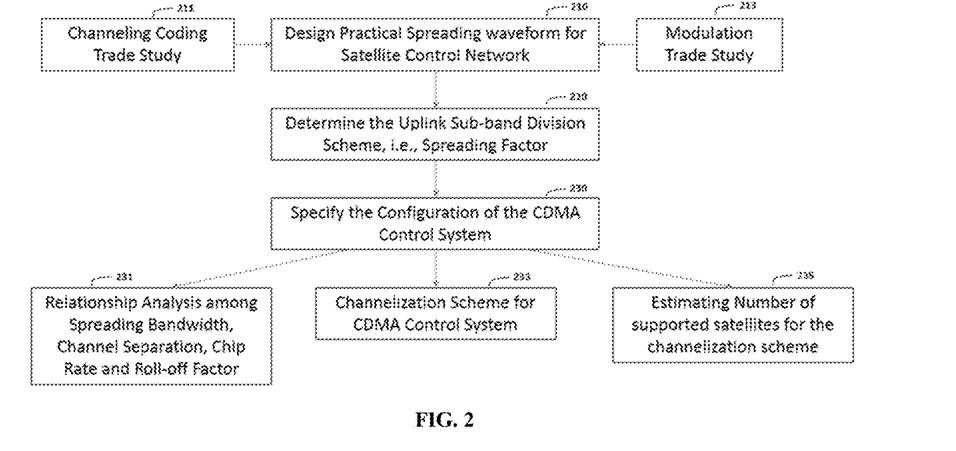
FIG. 2 illustrates a schematic flowchart of an exemplary uplink multiple access method for satellite control network in accordance with some embodiments of the disclosed subject matter.

Referring to FIG. 2, an exemplary schematic flowchart of an uplink multiple access method for satellite control network is shown in accordance with some embodiments of the disclosed subject matter. The uplink multiple access method for satellite control network is based on code division multiple access (CDMA) technology.

As illustrated, according to specific properties of a satellite control network, the uplink multiple access method for the satellite control network can include the following steps.

At step 210, practical uplink spreading waveform for SCN can be designed to leverage the advantage of various PN sequences. In some embodiments, during this step, a channel coding trade study and a modulation trade study can be conducted at step 211 and 213 to provide a comprehensive waveform design. A detailed description of a designed uplink spreading waveform for SCN based on steps 210, 211 and 213 can be referred to FIG. 3 described below.

In the uplink of the SCN system, all control data to be transmitted can originate at a single RTS 120 and be synchronized. It is thus possible to employ orthogonal spreading codes, such as Walsh code, to minimize a self-interference among all supported satellite operation (SATOP) users.

On the other hand, a spreading procedure can cover implementation issues. For example, the receiver of satellite operation (SATOP) users has to synchronize the spreading signal with extremely high chip rate. Then, only orthogonal spreading codes cannot solve all requirements.

Figure 3:
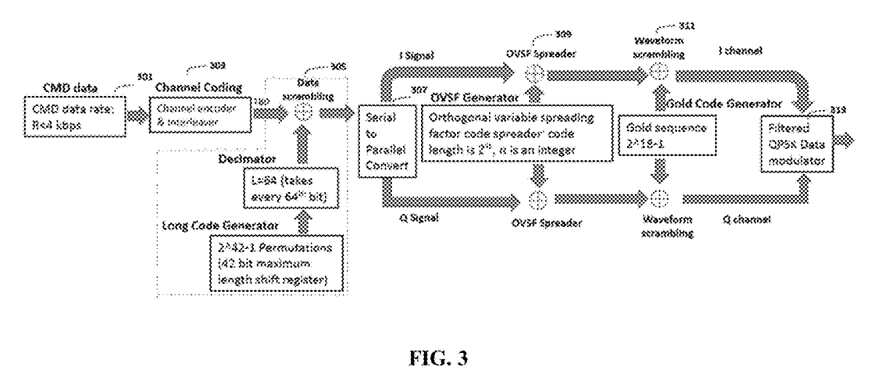
FIG. 3 illustrates a schematic flowchart of an exemplary uplink spreading waveform design for satellite control network in accordance with some embodiments of the disclosed subject matter.

FIG. 3 illustrates an exemplary schematic data flowchart of an uplink spreading waveform for satellite control network in accordance with some embodiments of the disclosed subject matter.

The designed practical uplink orthogonal variable spreading factor (OVSF) waveform based on CDMA can leverage various well-known spreading codes, and can be used for any suitable SCN uplink, such as the upgraded Air Force Satellite Control Network (AFSCN) uplink.

As shown in FIG. 3, the CMD data can be inputted at 301. The CMD data normally is a command data stream with low data rate. For example, the inputted data rate of the CMD data can be less than 4 kbps.

In some embodiments, a channel coding, in connection with the channel coding trade study at step 211 in FIG. 2, can be performed at 303 in the waveform development. The control raw data can be encoded by channel coding and interleaved for high reliability. The resulting data can then be processed by the designed spreading waveform.

The channel coding trade study can investigate various channel coding schemes, such as convolutional code, Turbo code, etc. It shows that the turbo code with S-Random interleaver can provide the best coding gain (i.e., 8.8 dB) over the uncoded waveform. For example, to obtain $10^{-5}$ bit error rate (BER), the uncoded system requires 9.6 dB Bit Signal-Noise-Ratio (BSNR), but the turbo code with S-Random interleaver reduces the required BSNR of the system to 0.8 dB.

In some embodiments, the encoded data can be scrambled with a long code at 305. The long code can be generated by a 42 bits maximum length shift register, which is a long code generator that has $2^{42}-1$ possible permutations. The final scrambled code can be decimated by 64 at a decimator. The resulting long code can be performed by an exclusive or (XOR) operation bit-by-bit with the input control data streams. The output data can look completely random. This scrambler operation at 305 can prevent an evil eavesdropper to guess the data content.

In some embodiments, when a modulation scheme analyzed by the modulation trade study at 213 in FIG. 2 is a Quadrature Phase Shift Keying (QPSK) scheme, the input data stream can be divided into two signals at a serial conducted parallel conversion 307. After the division, bits with odd index can be assigned to an I channel of I signal, other bits can be assigned to a Q channel of Q signal.

Next, data in both I channel and Q channel can be spread by orthogonal variable spreading factor code (OVSF) spreader at 309. The OVSF spreader 309 can be applied as a channelization code for separating different control data streams of satellites supported by one RTS 120. In some embodiments, the code length is $2^n$, n is an integer Similar to conventional Walsh code, OVSF codes can also provide orthogonality of each data channel, where the multiplexed data stream has no self-interference among data streams. On the other hand, different from the conventional Walsh code, OVSF codes can allow the system to support a variety of independent data streams with distinct bit rates. Since the spread signal bandwidth is the same for all users, the spreading factors (i.e., processing gain, etc.) for different users can be different.

Figure 4:
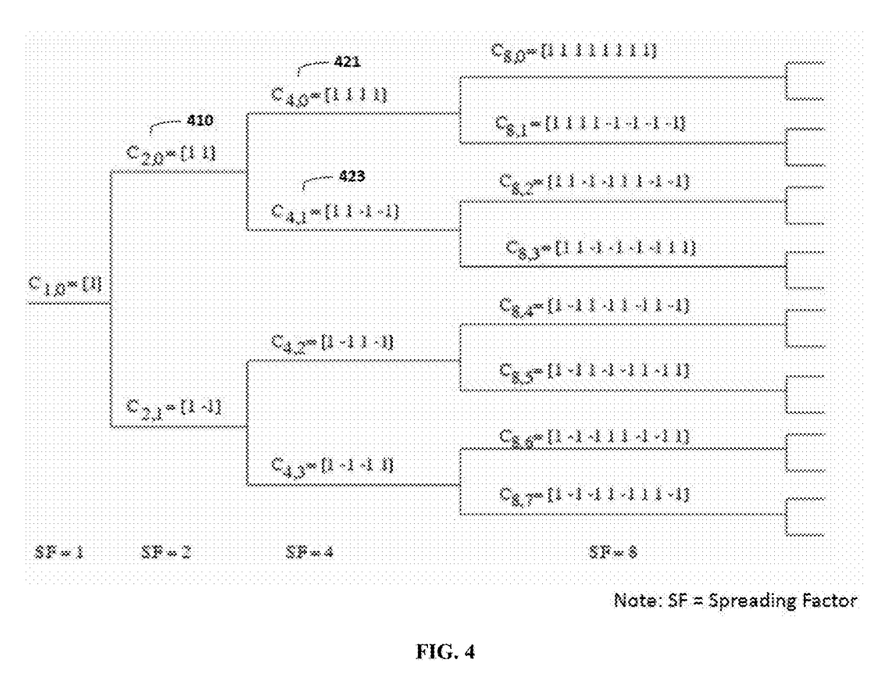
FIG. 4 illustrates an exemplary code tree structure for generating OSVF codes in accordance with some embodiments of the disclosed subject matter.

Referring to FIG. 4, the OVSF codes can be generated by the code tree structure. As illustrated, each root can derive two branches, and each branch can have a codeword extended from the root. For example, the root 410 has a codeword $C_{2,0}$, its root has two branches 421 and 423, and their codewords are $C_{4,0}=[C_{2,0}, C_{2,0}]$ and $C_{4,1}=[C_{2,0}, -C_{2,0}]$ It should be noted that, two OVSF codes can be orthogonal if and only if neither code lies on the path from the other code to the root.

Turning back to FIG. 3, the resulting bit stream after the OVSF code spreader can be performed a bit-by-bit XOR with a gold code by a gold code spreader at 311. The gold code can include two m-sequences with an 18 bits maximum length shift register, which is $2^{18}-1$ possible permutations. This step can provide more spreading in the spectrum domain for better interference tolerance, especially when OVSF codes don't have sufficient spreading. Also, when the OVSF code is set as all 1's, the transmission data is exactly the gold code. Then the satellite receiver can utilize the gold sequence to conduct the synchronization.

Before transmission, the signal can be modulated by a modulator 313, such that the modulated signal is suited to the characteristics of the transmission channel.

It should be noted that, the modulation trade study at 213 in FIG. 1 can analyze various modulation schemes, including Binary phase-shift keying (BPSK), Quadrature Phase Shift Keying (QPSK), filtered BPSK, filtered QPSK, minimum-shift keying (MSK), Gaussian Minimum Shift Keying (GMSK), 8 Phase Shift Keying (8PSK), and any other suitable modulation algorithm.

In some embodiments, the filtered BPSK and QPSK can be good candidates for the CDMA-based satellite control network. In a special embodiment with negligible interference, QPSK can be a preferred option with high throughput. In another special embodiment under severe impact from interference, BPSK can be a preferred option with lower error rate.

As shown in FIG. 3, filtered QPSK data modulator is used as an example to illustrate the data flow of the designed uplink spreading waveform for satellite control network, which does not limit the scope of the disclosed subject matter.

Turning back to FIG. 2, at step 220, an uplink frequency sub-band division scheme can be determined to optimize a tradeoff between the performance and implementation cost of CDMA-based SCN. In some embodiments, the uplink frequency sub-band division spreading factor can include a processing gain, or any other suitable parameters.

Figure 5:
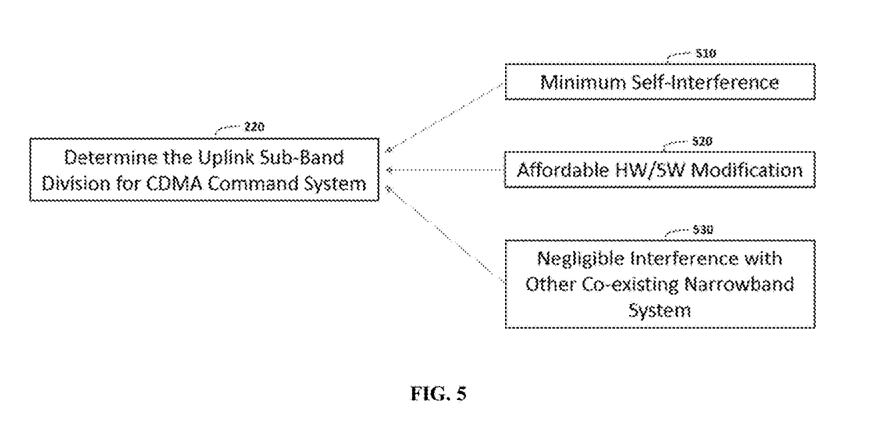
FIG. 5 illustrates an exemplary schematic flowchart for determining an uplink frequency sub-band division for a CDMA command system in accordance with some embodiments of the disclosed subject matter.

Normally, a satellite control network can operate within a L-band which has a frequency between 1760 MHz and 1842 MHz. Referring to FIG. 5, an exemplary schematic flowchart for determining an uplink frequency sub-band division for a CDMA command system is shown in accordance with some embodiments of the disclosed subject matter.

As illustrated, the uplink frequency sub-band division spreading factor, such as the processing gain, can be derived from the following perspectives: minimum self-interference at 510, affordable hardware/software (HW/SW) modification at 520, and negligible interference with other co-existing narrowband system at 530.

Regarding the minimum self-interference at 510, the orthogonal variable spreading factor (OVSF) code described above can be introduced in the waveform design. In the uplink scenario, all data streams sent by RTS 120 have been completely synchronized, then the OVSF code, inheriting from the Walsh code, can completely avoid self-interference among different data streams in the multiplexing signal. Thus, the SCN system has negligible self-interference among various data streams by OVSF codes, no matter what spreading factors are considered.

In terms of the HW/SW modification cost at 520, in the satellite or RTS, the spreading factor such as the processing gain can be limited to a value less than 40 dB, otherwise the HW/SW complexity may be costly.

For the negligible interference with other co-existing narrowband system at 530, it should be noted that, when the spreading bandwidth of the CDMA waveform increases, the CDMA system can have more robustness over the interference from the existing narrowband system. Therefore, a concept of jamming margin can be introduced to quantitatively identify the required spreading factor for desired interference mitigation capability. The jamming margin can be defined as a difference between the spreading gain and the required detector input signal-to-noise ratio, i.e., $$A/J = G_s - E_b/N_0 \text{ dB}, \tag{1}$$

where A/J is the jamming margin, the spreading gain $G_s$ is defined by a ratio of spread spectrum bandwidth to information bandwidth, i.e., $$G_s = 10\log\frac{W_{ss}}{W_b}, E_b/N_0$$

is a minimum required output signal to noise ratio per bit.

Given a desired interference tolerance and a bit error rate (BER) requirement, the required spreading factor can be determined accordingly based on the above equation. For example, in a satellite control network, the BER is required to be 1.0E−09, then the corresponding $E_b/N_0 \geq 13d$. If an approximate 12 dB anti-jamming margin is required to reject the other narrowband system users, it can be determined that the spreading gain is larger than 25 dB.

Turning back to FIG. 2, at step 230, a configuration of a complete CDMA command system can be specified to complete the development of the CDMA-based satellite control network.

As shown in FIG. 2, in some embodiments, the overall configuration can include three aspects, including relationship analysis among spreading bandwidth, channel separation, chip rate and roll-off factor at 231, channelization scheme for CDMA control system at 233, estimating number of supported satellites for the channelization scheme at 235.

Figure 6:
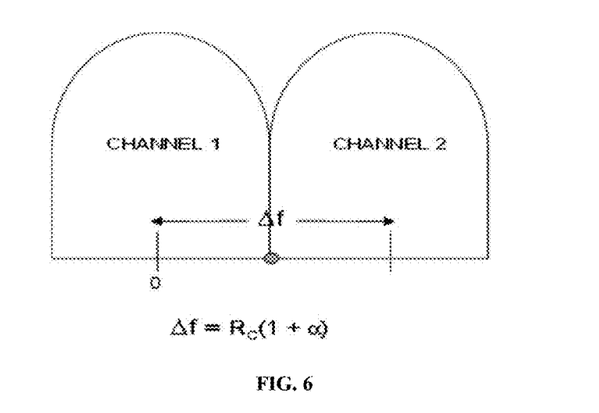
FIG. 6 illustrates an exemplary relationship analysis among spreading bandwidth, channel separation, chip rate and roll-off factor in accordance with some embodiments of the disclosed subject matter.

An exemplary detailed relationship analysis among spreading bandwidth, channel separation, chip rate and roll-off factor performed at 231 can be referred to FIG. 6. As depicted, the relationship among the chip rate $R_c$, roll-off factor $\alpha$, and channel separation $\Delta f$ can be given by $$\Delta f = R_c(1+\alpha), \quad (2).$$

The chip rate $R_c$, for the selected spreading sequence can be selected according to the following relationship, $$\frac{R_c}{R_s} = n, \quad (3)$$

where $R_s$ is an original data rate, n is an integer and depends on the processing gain (PG) as below:

$$PG = 10 \log(n) \quad (4).$$

From equation (2) along with a requirement that the ratio of chip rate to original data rate must be an integer as indicated by equation (3), it can be shown that the chip rate $R_{C_i}$ for a channel $i^{th}$ is related to the spreading bandwidth $W_{SS_i}$ through $$R_{C_i} = \left\lfloor \frac{W_{SS_i}}{(1+\alpha)} / R_s \right\rfloor R_s, \quad (5)$$

where $\lfloor x \rfloor$ denotes the smallest integer less than or equal to x.

Figure 7:
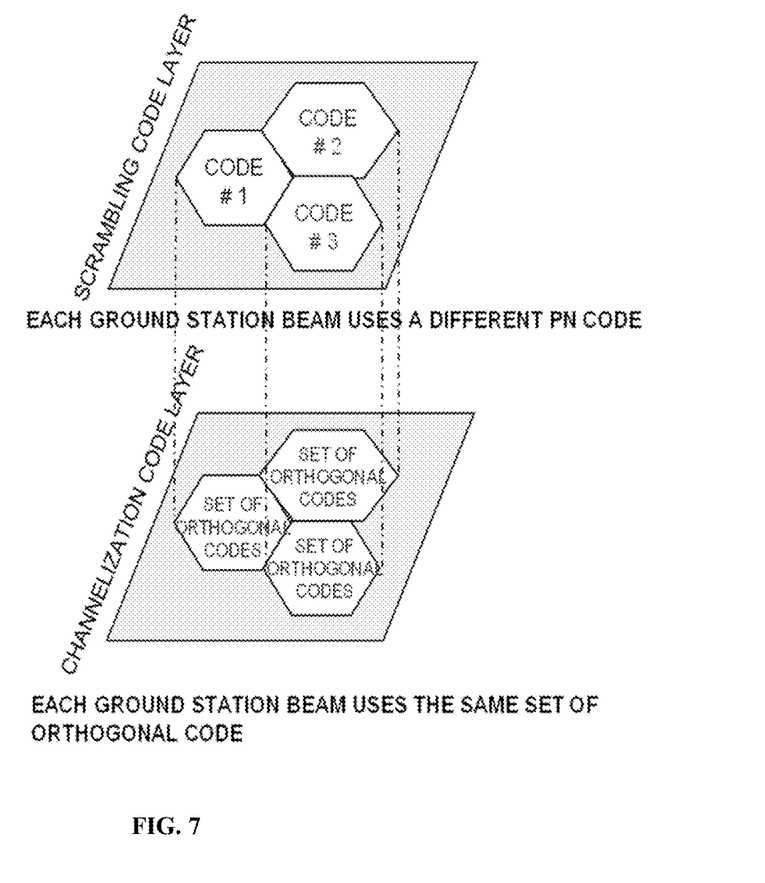
FIG. 7 illustrates an exemplary inter-beam asynchronous spreading code assignment in accordance with some embodiments of the disclosed subject matter.

The channelization scheme for CDMA-based SCN performed at 233 can include a spreading code assignment and a spectrum management. Referring to FIG. 7, an exemplary inter-beam asynchronous spreading code assignment is shown in accordance with some embodiments of the disclosed subject matter.

As illustrated, each remote tracking station antenna beam is assigned a unique scrambling code, and each user within an antenna beam is assigned a unique channelization spreading code. The channelization code for the satellite control uplink from ground tracking station to satellites are OVSF code, which can completely separate the all control data streams with perfect synchronization as mentioned in waveform design above. Also, the scrambling codes are Gold code, which can differentiate the signals from different ground stations due to the autocorrelation property of gold codes.

Figure 8:
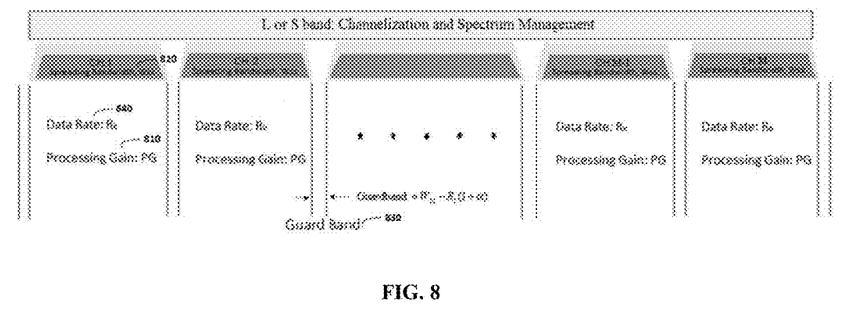
FIG. 8 illustrates an exemplary spectrum management in a channelization scheme for CDMA-based satellite control network in accordance with some embodiments of the disclosed subject matter.

Referring to FIG. 8, an exemplary spectrum management in a channelization scheme for CDMA-based satellite control network is shown in accordance with some embodiments of the disclosed subject matter. In the satellite control network, the L band or S band can be channelized into various CDMA channels that can accommodate current and future satellite control requirements. Each channel must be designed to meet specific processing gain (PG) 810, spreading bandwidth 820, guard band requirement 830, and data rate 840.

In the channelization scheme design, the desired guard band is provided for the Doppler Effect caused by the mobility of satellites. Therefore, the guard band requirement is derived based on Doppler frequency, and receiver's ability to deal with the Doppler frequency. The guard band requirement can be calculated from the spreading bandwidth $W_{SS}$ as follows:

$$\text{Guardband} = W_{SS} - R_c(1+\alpha), \quad (6).$$

In a particular example, when $W_{ss}$=5 MHz, $R_c$=3.84 Mcps, and $\alpha$=0.22, then the guard band is equal to 315 kHz.

Turing back to FIG. 2, the number estimation of satellite users for channelization scheme at 235 can determined by an acceptable performance degradation. For the satellite control service in the $i^{th}$ channel with the corresponding number of users $N_i$, a probability of bit rate error (BER) is given by $$Pe_i = \frac{1}{2}\text{erfc}\left\{\sqrt{\frac{E_{bi}}{N_0}\Delta_i}\right\}, \quad (7)$$

where $E_{bi}/N_0$ denotes a Bit Signal-Noise-Ratio (BSNR) for satellite control service in the $i^{th}$ channel, and $\Delta_i$ is a BSNR degradation factor for the satellite control service.

In some embodiments, the BSNR degradation factor in the $i^{th}$ channel can be calculated by $$\Delta_i = \frac{1}{1 + \frac{2}{2}\left\{\frac{E_{bi}}{N_0}\frac{p_i}{a_i PG_i}(N_i - 1)\right\}}, \quad (8)$$

where $a_i$ is a number of antenna beams in the $i^{th}$ channel, and $N_i$ is a number of satellites users in the $i^{th}$ channel. $PG_i$ is the processing gain. The parameter $p_i$ is a polarization isolation factor among antenna beams in the $i^{th}$ channel, which is described as $$p_i = 1 + \frac{10^{\frac{CP_i}{10}}}{2}, \quad (9)$$

where $CP_i$ denotes a cross-polarization in dB.

It should be noted that, in the above equations, there is a curve between the performance degradation and the number of supporting satellite users, which can be utilized to determine a maximum supporting users with acceptable performance degradation. That is, the antenna implementation factors, e.g., polarization isolation factor, can be incorporated into the performance degradation as the increase of the number of support satellites.

Figure 9:
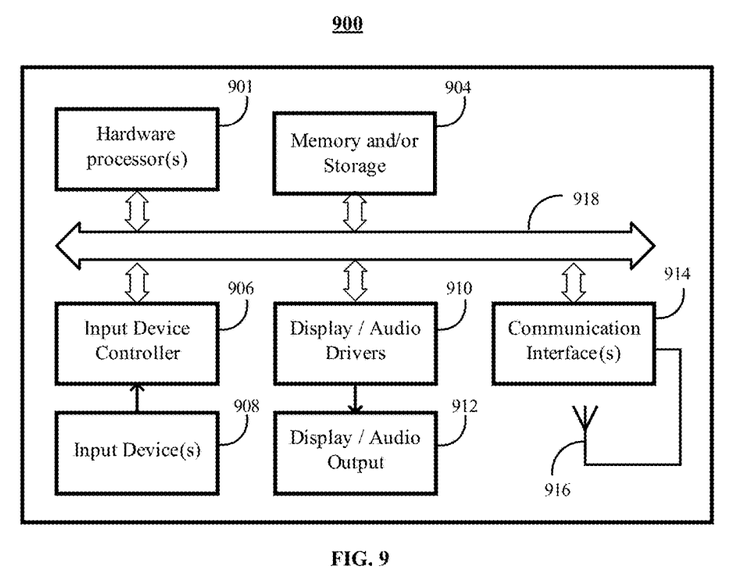
FIG. 9 is a schematic diagram of exemplary hardware of a remote tracking station in an uplink multiple access system for satellite control network in accordance with some embodiments of the disclosed subject matter.

Referring to FIG. 9, a schematic diagram of exemplary hardware of a remote tracking station in an uplink multiple access system for satellite control network is shown in accordance with some embodiments of the disclosed subject matter As illustrated in the exemplary hardware 900, such hardware can include at least one hardware processor 901, memory and/or storage 904, an input device controller 906, an input device 908, display/audio drivers 910, display and audio output circuitry 912, communication interface(s) 914, an antenna 916, and a bus 918.

The at least one hardware processor 901 can include any suitable hardware processor(s), such as microprocessor, micro-controller, a central process unit, graphics processing unit, digital signal processor, array processor, vector processor, dedicated logic, and/or any other suitable circuitry for controlling the functioning of a general purpose computer or special purpose computer in some embodiments.

In some embodiments, the at least one hardware processor 901 can implement or execute various embodiments of the disclosed subject matter including one or more method, steps and logic diagrams. For example, as described above in connection with FIGS. 2-3 and 5, the at least one hardware processor 901 can perform at least the steps of image partitions and classification visualization, etc.

The steps of the disclosed method in various embodiments can be directly executed by a combination of the at least one hardware processor 901 and one or more software modules. The one or more software modules may reside in any suitable storage/memory medium, such as a random access memory, a flash memory, a read-only memory, a programmable read-only memory, an electrically erasable programmable memory, a register, etc. The storage medium can be located in the memory and/or storage 904. The at least one hardware processor 901 can implement the steps of the disclosed method by combining the hardware and the information read from the memory and/or storage 904.

Memory and/or storage 904 can be any suitable memory and/or storage for storing programs, data, media content, comments, information of users and/or any other suitable content in some embodiments. For example, memory and/or storage 904 can include random access memory, read only memory, flash memory, hard disk storage, optical media, and/or any other suitable storage device.

Input device controller 906 can be any suitable circuitry for controlling and receiving input from one or more input devices 908 in some embodiments. For example, input device controller 906 can be circuitry for receiving input from a touch screen, from one or more buttons, from a voice recognition circuit, from a microphone, from a camera, from an optical sensor, from an accelerometer, from a temperature sensor, from a near field sensor, and/or any other suitable circuitry for receiving user input.

Display/audio drivers 910 can be any suitable circuitry for controlling and driving output to one or more display and audio output circuitries 912 in some embodiments. For example, display/audio drivers 910 can be circuitry for driving an LCD display, a speaker, an LED, and/or any other display/audio device.

Communication interface(s) 914 can be any suitable circuitry for interfacing with one or more communication networks. For example, interface(s) 914 can include network interface card circuitry, wireless communication circuitry, and/or any other suitable circuitry for interfacing with one or more communication networks. In some embodiments, communication network can be any suitable combination of one or more wired and/or wireless networks such as the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), a WiFi network, a WiMax network, a satellite network, a mobile phone network, a mobile data network, a cable network, a telephone network, a fiber optic network, and/or any other suitable communication network, or any combination of any of such networks.

Antenna 916 can be any suitable one or more antennas for wirelessly communicating with a communication network in some embodiments. For example, as shown in FIG. 1, antenna 916 can be a remote tracking station (RTS) antenna 121 that can transmit signals via uplink to realize multiple access to the satellite control network (SCN).

Bus 918 can be any suitable mechanism for communicating between two or more of components 901, 904, 906, 910, and 914 in some embodiments. Bus 918 may be an ISA bus, a PCI bus, an EISA bus, or any other suitable bus. The bus 918 can be divided into an address bus, a data bus, a control bus, etc. The bus 918 is represented as a two-way arrow in FIG. 9, but it does not mean that it is only one type bus or only one bus.

Any other suitable components not shown in FIG. 9 can be included in hardware 900 in accordance with some embodiments. Any unnecessary components shown in FIG. 9 may also be omitted in hardware 900 in accordance with some other embodiments.

In some embodiments, the flowcharts and block diagrams in the figures illustrate various embodiments of the disclosed method and system, as well as architectures, functions and operations that can be implemented by a computer program product. In this case, each block of the flowcharts or block diagrams may represent a module, a code segment, a portion of program code. Each module, each code segment, and each portion of program code can include one or more executable instructions for implementing predetermined logical functions.

It should also be noted that, in some alternative implementations, the functions illustrated in the blocks be executed or performed in any order or sequence not limited to the order and sequence shown and described in the figures. For example, two consecutive blocks may actually be executed substantially simultaneously where appropriate or in parallel to reduce latency and processing times, or even be executed in a reverse order depending on the functionality involved in.

It should also be noted that, each block in the block diagrams and/or flowcharts, as well as the combinations of the blocks in the block diagrams and/or flowcharts, can be realized by a dedicated hardware-based system for executing specific functions, or can be realized by a dedicated system combined by hardware and computer instructions.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, and/or any other suitable media), optical media (such as compact discs, digital video discs, Blu-ray discs, and/or any other suitable optical media), semiconductor media (such as flash memory, electrically programmable read only memory (EPROM), electrically erasable programmable read only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

Accordingly, a method for uplink multiple accessing based on code division multiple access (CDMA) technology and a related system are provided. In the satellite control network, the disclosed uplink multiple accessing method based on CDMA scheme can provide an evident improvement in spectrum efficiency and interference mitigation capability for a desired equipment. Further, the disclosed uplink multiple accessing method based on CDMA scheme can also preserve properties of the satellite control data, e.g., reliable transmission, error-free, etc.

Although the disclosed subject matter has been described and illustrated in the foregoing illustrative embodiments, it is understood that the present disclosure has been made only by way of example, and that numerous changes in the details of embodiment of the disclosed subject matter can be made without departing from the spirit and scope of the disclosed subject matter, which is only limited by the claims which follow. Features of the disclosed embodiments can be combined and rearranged in various ways. Without departing from the spirit and scope of the disclosed subject matter, modifications, equivalents, or improvements to the disclosed subject matter are understandable to those skilled in the art and are intended to be encompassed within the scope of the present disclosure.

What is claimed is:

1. An uplink multiple accessing method for satellite control network (SCN), comprising:
   designing a practical uplink spreading waveform for a code division multiple access (CDMA) based SCN by leveraging a plurality of pseudorandom sequences and investigating a channel coding block and a modulation block for the CDMA based SCN;
   determining an uplink frequency sub-band division for the CDMA based SCN to optimize a tradeoff between a performance and an implementation cost of CDMA based SCN; and
   specifying a configuration of a control system of the CDMA based SCN by:
      analyzing a relationship among a spreading bandwidth, a channel separation, a chip rate and a roll-off factor of the CDMA based SCN,
      developing a channelization scheme for the control system of the CDMA based SCN, and
      estimating a number of supported satellites for the channelization scheme by:
         generating an equation of a probability of bit rate error for a satellite control service by using a Bit Signal-Noise-Ratio (BSNR) degradation factor for the satellite control service, wherein the equation of the probability of bit rate error for the satellite control service in an $i^{th}$ channel with a corresponding number of users $N_i$ is:

$$Pe_i = \frac{1}{2}\mathrm{erfc}\left\{\sqrt{\frac{E_{bi}}{N_0}\Delta_i}\right\},$$

wherein $E_{bi}/N_0$ is a BSNR for satellite control service in the $i^{th}$ channel, and $\Delta_i$ is the BSNR degradation factor for the satellite control service in the $i^{th}$ channel,
obtaining the BSNR degradation factor based on a polarization isolation factor among antenna beams in the one channel, and
determining a maximum supporting users using the equation.

2. The uplink multiple accessing method of claim 1, wherein the plurality of pseudorandom sequences include Walsh code and Gold code.

3. The uplink multiple accessing method of claim 2, wherein designing the practical uplink spreading waveform, and investigating a channel coding block and a modulation block include:
   Receiving a plurality of raw control data streams;
   channel coding and interleaving each raw control data stream to generate an encoded control data stream;
   dividing each encoded control data stream into an I signal modulated by an in-phase modulation, and a Q signal modulated by a quadrature-phase modulation;
   spreading the I signal and the Q signal of each encoded control data stream by a corresponding orthogonal variable spreading factor (OVSF) code spreader for separating each encoded control data stream with other encoded control data streams; and
   modulating the I signal and the Q signal of each encoded control data stream to generate modulated signals that are suited to characteristics of transmission channel.

4. The uplink multiple accessing method of claim 3, after channel coding and interleaving each raw control data stream and before dividing each encoded control data stream, the method further comprises:
   generating a long code by a 42 bits maximum length shift register; and
   scrambling each encoded control data stream with the long code.

5. The uplink multiple accessing method of claim 3, after spreading the I signal and the Q signal of each encoded control data stream and before modulating the I signal and the Q signal of each control data stream, the method further comprises:
   performing a bit-by-bit XOR operation to each control data stream with the Gold code by a gold code spreader to increase an interference tolerance of the encoded control data streams.

6. The uplink multiple accessing method of claim 3, wherein spreading the signal and the Q signal of each encoded control data stream includes:
   generating a tree-structured OVSF code to provide orthogonality for separating each encoded control data streams,
   wherein the tree-structured OVSF code has at least one root that derives two branches, and each branch has a codeword extended from the root.

7. The uplink multiple accessing method of claim 3, wherein:
   modulating the I signal and the Q signal of each encoded control data stream is performed by a filtered Quadrature Phase Shift Keying (QPSK) data modulator.

8. The uplink multiple accessing method of claim 3, wherein modulating the I signal and the Q signal of each encoded control data stream is using at least one of the following modulation algorithm: Binary phase-shift keying (BPSK), Quadrature Phase Shift Keying (QPSK), filtered BPSK, filtered QPSK, minimum-shift keying (MSK), Gaussian Minimum Shift Keying (GMSK), and 8 Phase Shift Keying (8PSK).

9. The uplink multiple accessing method of claim 1, wherein:
   the spread plurality of encoded control data streams have a same bandwidth for all users; and
   an uplink frequency sub-band division spreading factor for different users are different.

10. The uplink multiple accessing method of claim 9, wherein:
    the uplink frequency sub-band division spreading factor includes a processing gain, which is derived from a minimum self-interference, an affordable hardware/ software modification, and a negligible interference with a co-existing narrowband system.

11. The uplink multiple accessing method of claim 10, wherein determining the processing gain includes:
calculating a jamming margin to quantitatively describe a relation between the processing gain and an interference tolerance of the CDMA based SCN over the co-existing narrowband system.

12. The uplink multiple accessing method of claim 10, wherein the jamming margin is calculated by using an equation of:

$$A/J = G_s - E_b/N_0,$$

wherein A/J is the jamming margin, $G_s$ is the processing gain defined by a ratio of a spread spectrum bandwidth to an information bandwidth, and $E_b/N_0$ is a minimum required output signal to noise ratio per bit.

13. The uplink multiple accessing method of claim 1, wherein the channelization scheme includes an inter-beam asynchronous spreading code assignment and a spectrum management.

14. The uplink multiple accessing method of claim 13, wherein the inter-beam asynchronous spreading code assignment includes:
assigning a unique scrambling code for each remote tracking station antenna beam; and
assigning a unique channelization spreading code for each user within an antenna beam.

15. The uplink multiple accessing method of claim 14, wherein:
the unique scrambling code is Gold code; and
the unique channelization spreading code is orthogonal variable spreading factor (OVSF) code.

16. The uplink multiple accessing method of claim 1, wherein the spectrum management includes:
designing each channel to provide the processing gain, the spreading bandwidth, a data rate, and a guard band requirement, wherein the guard band requirement is derived based on a Doppler Effect caused by mobility of satellites.

17. The uplink multiple accessing method of claim 1, wherein:
$\Delta_i$ is calculated by $$\Delta_i = \frac{1}{1 + \frac{2}{3}\left\{\frac{E_{bi}}{N_0}\frac{p_i}{a_i PG_i}(N_i - 1)\right\}},$$

wherein $a_i$ is a number of antenna beams in the $i^{th}$ channel, $PG_i$ is the processing gain, $p_i$ is the polarization isolation factor among the antenna beams in the $i^{th}$ channel, which is calculated by $$p_i = 1 + \frac{10^{\frac{CP_i}{10}}}{2},$$

wherein $CP_i$ is a cross-polarization.

18. A system for uplink multiple accessing for satellite control network (SCN), comprising:
a hardware processor that is programmed to:
design a practical uplink spreading waveform for a code division multiple access (CDMA) based SCN by leveraging a plurality of pseudorandom sequences and investigate a channel block and a modulation block for the CDMA based SCN;
determine an uplink frequency sub-band division for the CDMA based SCN to optimize a tradeoff between a performance and an implementation cost of CDMA based SCN; and
specify a configuration of a control system of the CDMA based SCN by:
analyzing a relationship among a spreading bandwidth, a channel separation, a chip rate and a roll-off factor of the CDMA based SCN,
developing a channelization scheme for the control system of the CDMA based SCN, and
estimating a number of supported satellites for the channelization scheme by:
generating an equation of a probability of bit rate error for a satellite control service by using a Bit Signal-Noise-Ratio (BSNR) degradation factor for the satellite control service, wherein the equation of the probability of bit rate error for the satellite control service in an $i^{th}$ channel with a corresponding number of users $N_i$ is:

$$Pe_i = \frac{1}{2}\mathrm{erfc}\left\{\sqrt{\frac{E_{bi}}{N_0}\Delta_i}\right\},$$

wherein $E_{bi}/N_0$ is a BSNR for satellite control service in the $i^{th}$ channel, and $\Delta_i$ is the BSNR degradation factor for the satellite control service in the $i^{th}$ channel,
obtaining the BSNR degradation factor based on a polarization isolation factor among antenna beams in the one channel, and
determining a maximum supporting users using the equation.

* * * * *